United States Patent [19]

Ely

[11] Patent Number: 4,480,184

[45] Date of Patent: Oct. 30, 1984

[54] MOLDED OPTICAL WAVEGUIDE SWITCHING APPARATUS

[75] Inventor: Richard I. Ely, Orange Park, Fla.

[73] Assignee: Burroughs Corporation, Detroit, Mich.

[21] Appl. No.: 358,826

[22] Filed: Mar. 16, 1982

[51] Int. Cl.$^3$ .............................................. G02B 5/14
[52] U.S. Cl. ................................. 250/227; 250/229; 340/365 P
[58] Field of Search ............... 250/216, 227, 229, 221; 350/96.15, 96.16, 96.18, 96.12; 340/365 P; 73/705; 400/474, 479, 479.2; 178/17 D

[56] References Cited

U.S. PATENT DOCUMENTS

| | | | |
|---|---|---|---|
| 3,648,050 | 3/1972 | Koo | 340/365 P |
| 3,787,837 | 1/1974 | Allen et al. | 340/365 P |
| 3,856,127 | 12/1974 | Halfon et al. | 250/221 |
| 3,947,087 | 3/1976 | Furata et al. | 350/96.12 |
| 4,142,877 | 3/1979 | Auracher et al. | 350/96.15 |

Primary Examiner—David C. Nelms

Attorney, Agent, or Firm—Carl Fissell, Jr.; Edmund M. Chung; Kevin R. Peterson

[57] ABSTRACT

Molded optical waveguide switching apparatus wherein a flat, planar light transmissive plastic member of a refractive index $N_2$ is premolded with orthogonally arranged obverse and reverse grooves or channels and wherein each such channel or groove is filled-in or molded with a light transmissive plastic of a refractive index $N_1$ (where $N_1 > N_2$) effectively forming front and back light conducting channels or waveguides at right angles to one another on the flat planar member. A gently curved tap is molded into the intersecting area of each row and column waveguide with a through opening or aperture formed adjacent each intersection. The taps of the obverse side are curved downwardly to meet the upwardly curved taps of the reverse side of the planar member. Light blocking and unblocking members are operably disposed in respective apertures to interrupt light from light generating to light receiving receptors.

7 Claims, 6 Drawing Figures

FIG. 2.
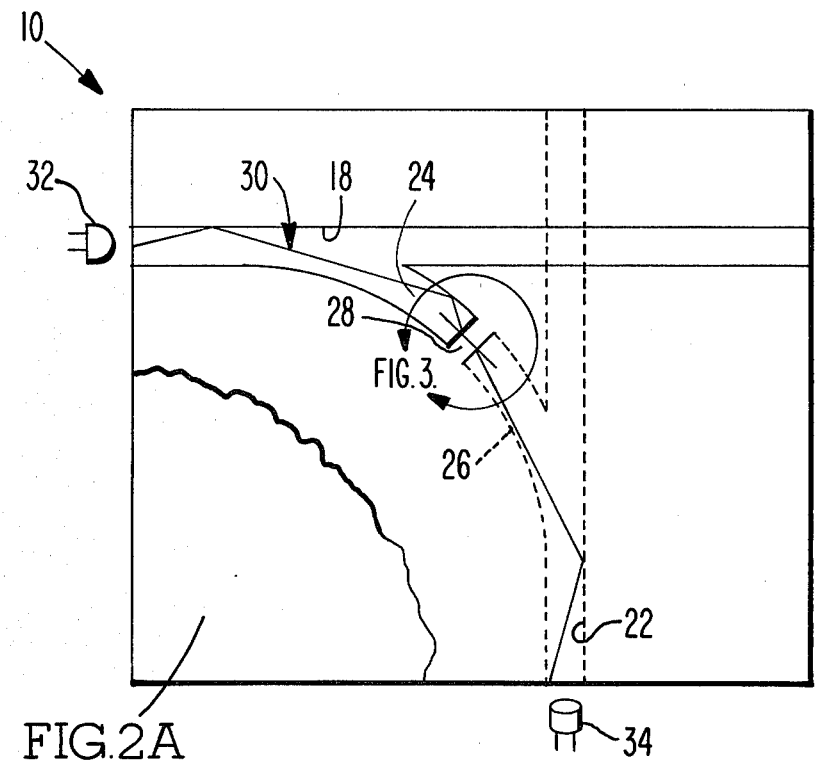
FIG. 2A
FIG. 3.
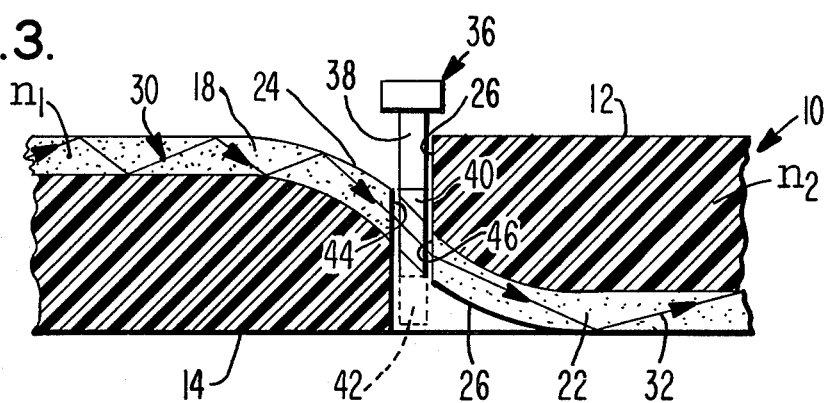

MOLDED OPTICAL WAVEGUIDE SWITCHING APPARATUS

CROSS REFERENCE TO RELATED APPLICATIONS

The present application is related to the following listed applications dealing with similar subject matter all assigned to the same assignee as the present application and filed concurrently herewith.

"FIBER WRAP KEYBOARD AND SWITCH", U.S. Ser. No. 358,825, filed Mar. 16, 1982, in the names of Wunnava V. Subbarao, Richard I. Ely and Carl E. Mosier and James E. Andree;

"MULTI-PLANE OPTICAL MEMBRANE SWITCH APPARATUS", U.S. Ser. No. 358,823, filed Mar. 16, 1982, in the names of Richard I. Ely and Wunnava V. Subbarao;

"MOLDED OPTICAL KEYBOARD HAVING FIBER OPTIC KEYS", U.S. Ser. No. 358,824, filed Mar. 16, 1982, in the names of Wunnava V. Subbarao, Richard I. Ely and Carl E. Mosier.

"SINGLE PLANE OPTICAL MEMBRANE SWITCH AND KEYBOARD", U.S. Ser. No. 358,822, filed Mar. 16, 1982, in the name of Richard I. Ely.

BACKGROUND OF THE INVENTION

1. Field of the Invention

The invention relates to photo-optical switches and keyboards and more particularly to a flat planar monolithic photo-optical switch and keyboard apparatus.

2. Description of the Prior Art

Fiber optical keyboards and switches are of interest because they reduce the number of light emitting diodes (LED's) and detectors that may be required, unlike the one for one requirement of earlier photo-optical keyboards.

One LED can illuminate a bundle of fibers, each one of which goes to a separate key on the keyboard. At each key another fiber receives the transmitted light and conducts it to a photo-detector. If a key is depressed the light is blocked by the key stem or blade and the detector "sees" the loss of light as an operational signal. By multiplexing the LED's and detectors only one LED is required for each row and one detector for each column in a keyboard matrix.

A problem with the fiber optic keyboard is the present difficulty is fabricating and/or assembling all the fibers into a keyboard matrix array. It would be difficult to automate and the cost of assembly could conceivably out weigh the cost savings resulting from the reduced numbers of LED's and detectors.

It is an important object therefore of the present invention to solve these and other problems in a new, novel and heretofore unobvious manner.

Another object of the invention is to avoid the necessity or requirement for individual fiber strands or elements thus overcoming the assembly problems.

It is also an object of the invention to provide a one piece, molded, integrated optical assembly in the form of a keyboard matrix.

SUMMARY OF THE INVENTION

An integrated, molded, one piece optical assembly comprises a flat, planar plastic base member of a low index of refraction material having a matrix of orthogonally arranged grooves, disposed in rows and columns, with the grooves forming the rows molded into one surface of the planar member and the grooves forming the columns molded into the opposite, parallel surface of this member. The row and column grooves are filled with a second higher index of refraction type of plastic material effectively producing flat rectangular waveguides (rather than the circular type which would result from employing bundles of fibers). The horizontal rows are formed in the top of the base member while the vertical columns are formed in the bottom of the base member. Curved taps are located adjacent each row and column intersection with an aperture or through opening intermediate the ends of each curved tap. The taps of the rows are curved toward the taps of the columns (i.e. toward the middle of the intersection) so that light from a horizontal row waveguide is transmitted to a vertical column waveguide (i.e. from the top to the bottom of the matrix). A light blocking element such as an opaque member or key blade reciprocably movable within the opening alternately blocks and unblocks the light to the associated light detector.

In order to increase the light coupling between the upper and lower waveguides the key blade may be fabricated from two different plastic materials, one black and one clear. The clear section would transmit the light when it enters the region of the intersection. The clear portion reduces the effective optical thickness of the gap between the two waveguides. This is similar to the effect that makes objects in water (beneath the surface) appear closer to the surface than they really are.

Additionally, a further increase in the light coupling between upper and lower waveguides can be produced by molding a lens into the key blade.

BRIEF DESCRIPTION OF THE DRAWINGS

FIG. 1B is a front elevational view of the device of FIG. 1a;

FIG. 2 is a greatly enlarged portion of the structure of FIG. 1 illustrating the aperture between upper and lower waveguides;

FIG. 3 is an enlarged detail sectional side elevational view of the portion circled in FIG. 2.

DESCRIPTION OF THE PREFERRED EMBODIMENT

The present apparatus provides a one piece, unitary, integrated, molded optical assembly which in the present embodiment is illustrated as a keyboard matrix.

Figure 1:
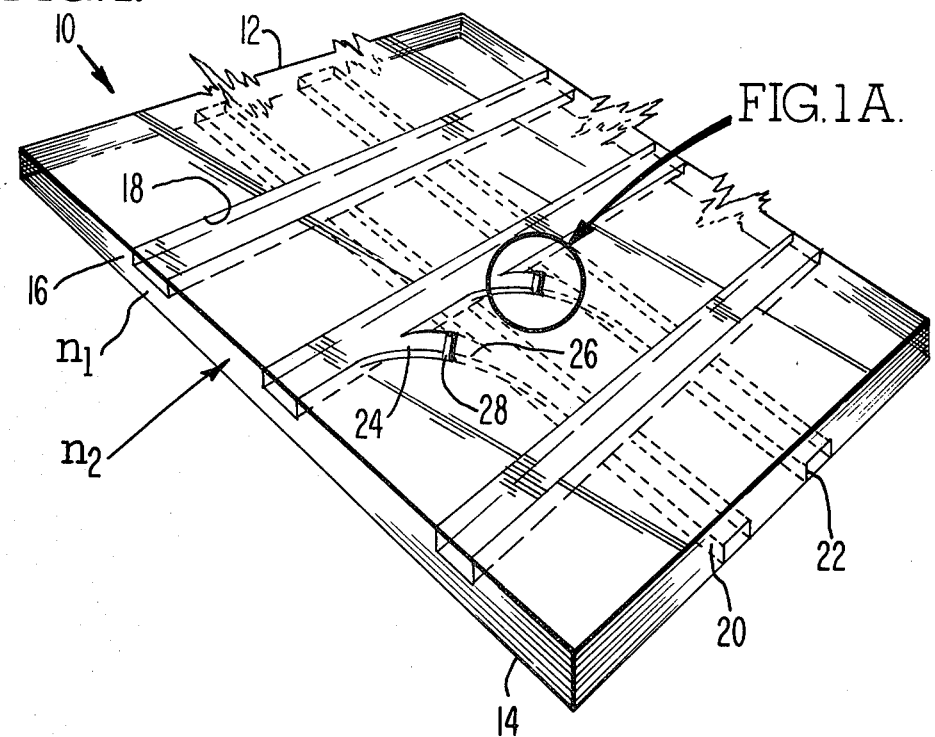
FIG. 1 is a schematic top plan view (not to scale) of the structure according to the teachings of the present invention.

A single, rigid piece of transparent plastic 10, of generally rectangular or square outline as seen in FIG. 1 having a top and bottom surface 12 and 14, respectively, is molded to provide a plurality of horizontal rows 16 slightly under cut to form depressions or grooves in the top surface 18 in surface 12 extending from one outboard edge of member 10 to within a short distance of the opposite outboard edge of member 10. A plurality of columns 20 having similar undercut depressions or grooves 22 are molded into the opposite surface 14 thereof.

Figure 1A:
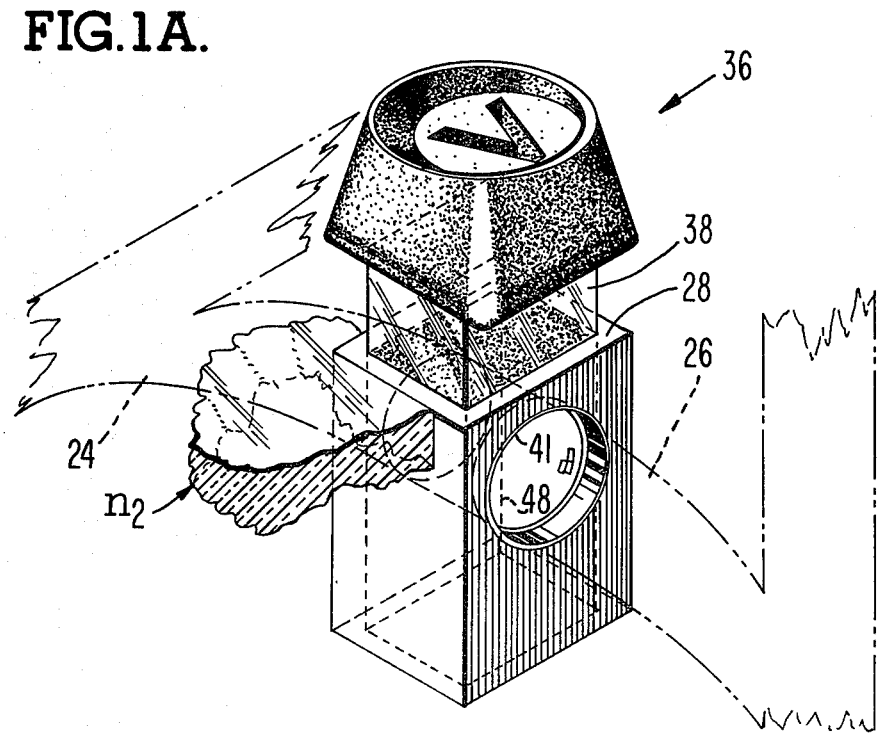
FIG. 1A is a partial sectional view of the area circled (FIG. 1a) in FIG. 1.
Figure 2A:
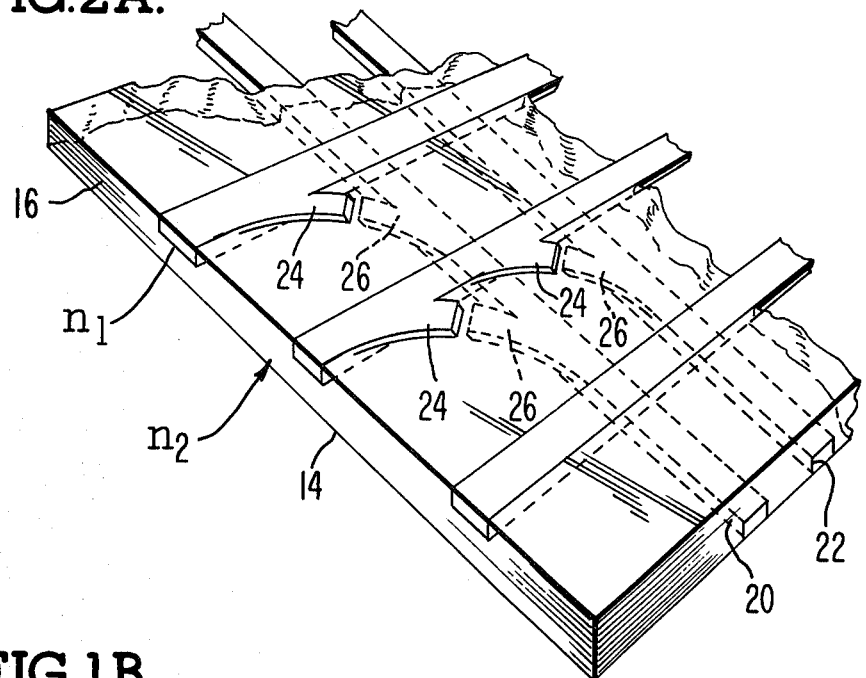
FIG. 2A is a detail view of one of the curved tap or coupling mechanism.
Figure 1B:
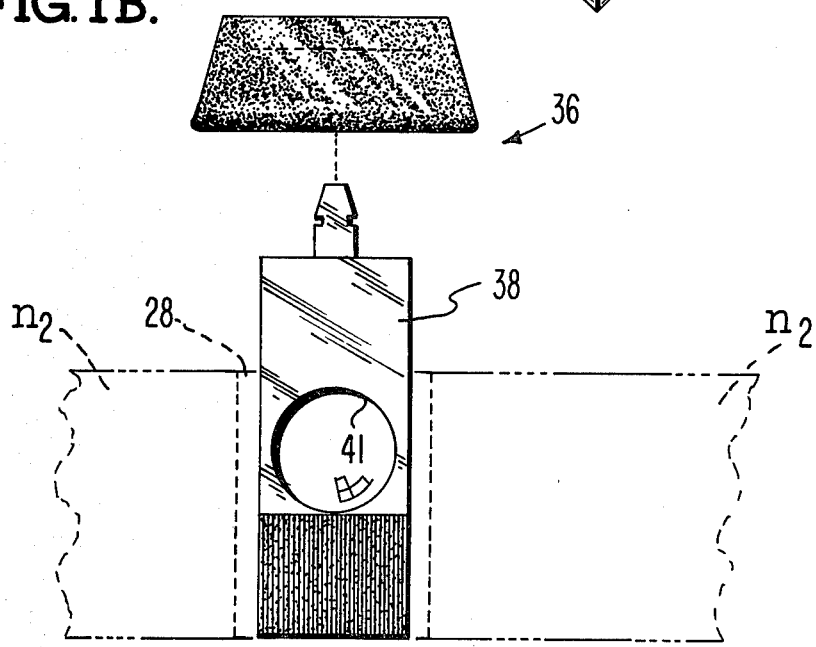

At the intersecting areas between grooves 18 and grooves 22 (top and bottom) upper and lower curved taps 24 and 26 respectively, are provided, shown in FIG. 1, but more clearly depicted in FIGS. 1A and 2. As seen in the enlarged view of FIG. 3 the upper tap 24 is curved in two directions i.e. away from its origin and downwardly toward its opposite upwardly curved tap 26 extending upwardly from the opposite surface 14.

At approximately the precise midpoint of the cross over or intersection of the two taps 24 and 26 an aperture or opening 28 is formed in the member 10 and extends into and through this member, as shown quite clearly in FIG. 3.

By forming the base plate member 10 of a low index of refraction material $N_2$ and molding into the grooves 18 and 20 a material of a higher index or refraction $N_1$ FIG. 1, light 30 from light generator 32 will be conducted into and through the row grooves 18 over the tap 24. Across the opening 28 and into the column groove 22 via lower tap 26 to be intercepted by column light receiver 34. Note that the gently curved taps 24 and 26 lead the light 30 across the gap without substantial attenuation.

A key structure 36, illustrated in outline in FIGS. 1a and 3 (in a light passing position) includes a blade 38 having a transparent light passing portion 40, FIG. 4 (or an opening 41 as seen in FIG. 1a) and a light blocking portion 42. The key 36 is shown in the depressed position in which the light passing portion 40 is adjacent the two confronting ends 44 and 46 of the upper and lower waveguide 18 and 22, respectively so that light 30 passes across the opening 26 and procudes a signal at the light receptor 34.

Raising the key 36, as by means of a return spring (not shown) causes the light blocking portion 42 to be elevated into the gap area 28 so that light 30 is blocked from the photo-receptor 34. A key blade construction could include a clear or transparent portion 40 and an opaque or black portion 42.

By judicious choice of materials and appropriate parameters of the opening 26 and base 38 a lens or lenses 48 FIG. 1a may be employed with the key structure 36 so as to increase the light coupling between the upper and lower wave guide channels.

What is claimed is:

1. Molded optical waveguide switching apparatus comprising;

a base member of light transmitting material having an index of refraction $N_2$;

said base member including a plurality of obverse and reverse light conducting grooves arranged in an orthogonal array with the horizontal grooves of the obverse side of said base member at right angles to the vertical grooves of the reverse side of said member;

light generating means disposed adjacent to one end of each obverse groove, light receptor means disposed adjacent to one end of each reverse groove, an individual tap member disposed at the intersection of each horizontal and vertical column groove with the taps of the horizontal grooves oriented toward the taps of the vertical column grooves;

an individual aperture disposed at each intersecting pair of taps, said aperture extending into and through said base member; and a light blocking/unblocking member arranged for movement within each aperture effective to interrupt light from said light generating means to said light receptor means indicating switch closure.

2. The invention in accordance with claim 1 wherein said flat planar member is molded from light transmissive material having a refractive index of $N_2$.

3. The invention in accordance with claim 1 wherein each of the obverse and reverse grooves of said base member are molded of a light transmissive material of a refractive index $N_1$ where $N_1 > N_2$.

4. The invention in accordance with claim 1 wherein each said tap is gently curved out of the horizontal plane and wherein each said tap is curved out of the vertical plane toward the tap of said horizontal plane.

5. The invention in accordance with claim 1 wherein said light blocking/unblocking member comprises a plastic element having a integral opaque light obstructing portion and a light transmitting portion.

6. The invention in accordance with claim 1 wherein said molded optical waveguide switching apparatus comprises a single, one piece, flat, planar, monolithic structure wherein both the grooves and apertures include molded filled and formed light transmissive material to provide an orthogonal array of switchable light conducting channels.

7. The invention in accordance with claim 1 wherein said light blocking/unblocking member further includes lens means for increasing the lignt coupling between adjacent taps effectively increasing light output.

* * * * *